United States Patent [19]

Hillmer et al.

[11] 3,988,199

[45] Oct. 26, 1976

[54] PERLITE INSULATION BOARD AND METHOD OF MAKING THE SAME

[75] Inventors: Roy Wayne Hillmer, Parker; Nicholas Francis Morrone; Chester Robert Slahetka, both of Littleton, all of Colo.

[73] Assignee: Johns-Manville Corporation, Denver, Colo.

[22] Filed: Jan. 27, 1975

[21] Appl. No.: 544,082

[52] U.S. Cl. .................. 162/101; 162/171; 162/175; 162/181 A; 162/181 C
[51] Int. Cl.² ................................ D21D 3/00
[58] Field of Search ........... 162/181 A, 181 C, 171, 162/101, 175; 428/306, 310, 314; 264/42, 333

[56] References Cited
UNITED STATES PATENTS

| 3,244,632 | 4/1966 | Schulz | 162/171 |
| 3,552,985 | 1/1971 | Hawkins | 162/154 |
| 3,764,357 | 10/1973 | Bowles et al. | 264/42 |
| 3,770,859 | 11/1973 | Bevan | 264/333 |

Primary Examiner—S. Leon Bashore
Assistant Examiner—Peter Chin
Attorney, Agent, or Firm—Robert M. Krone; Joseph J. Kelly; Stephen C. Shear

[57] ABSTRACT

A perlite insulation board is disclosed herein and includes, as conventional ingredients, expanded perlite, organic fiber and binder, the perlite, being the largest single ingredient, by dry weight, in the board. The insulation board also includes gypsum in an amount less than the perlite but preferably in an amount sufficient to form a gypsum matrix throughout the board. A method of making a perlite insulation board of the general type just described is also disclosed herein.

25 Claims, 3 Drawing Figures

PERLITE INSULATION BOARD AND METHOD OF MAKING THE SAME

BACKGROUND OF THE INVENTION

The present invention relates generally to perlite insulation boards and more particularly to a perlite insulation board having gypsum as an essential ingredient and method of making the gypsum-containing board.

Perlite insulation boards have been and continue to be successful products of the roofing industry as insulation under a built-up roof. A typical perlite insulation board includes expanded perlite as its main ingredient, organic fiber (for example, newsprint) and binder (for example, asphalt and starch). An insulation board of this type is described in U.S. Letters Patent 3,042,578 issued to Paul S. Denning on July 3, 1962.

An actual commercially successful perlite insulation board of the type discussed above is manufactured by Johns-Manville Corporation under the trademark "FESCO". This board, which consists essentially of perlite, newsprint fiber, asphalt and possibly starch has a dry weight density of approximately 10 lbs./ft.$^3$. Its coefficient of thermal conductivity ($k$ value) is approximately 0.376. Other physical characteristics include modulus of rupture (MR), interlaminar strength and water absorption resistance. Standard FESCO board has an MR of between 50 psi and 60 psi an interlaminar strength of between 6 psi and 10 psi, and water absorption resistance of between 1% and 2% (by volume) for short-term absorption (2 hrs.) and between 20 and 24% (by volume) for long-term absorption (more than 3 weeks).

The physical characteristics just discussed are of primary import in making FESCO insulation board or, for that matter, any other commercially available perlite insulation board, a commercially successful board for its intended use as roof insulation. It must have a sufficiently low K value to provide adequate insulation at not unreasonable thicknesses. It must be relatively light in weight so as to be easily installed in the field and yet it must be sufficiently strong so as to resist damage during installation in the field or enroute. Further, the insulation board should be somewhat resistant to water since it may likely be exposed to the elements, at least between the time it is installed and eventually covered by, for example, a built-up roof.

One standard way in which perlite insulation board of the type described is made is by a continuous wet forming process utilizing a Fourdrinier machine. A dilute aqueous slurry including the expanded perlite, fiber and binder is prepared and deposited in the headbox of the Fourdrinier. At the headbox, the slurry is moved on to a moving screen so as to form a wet mat from the slurry solids. This wet mat is dewatered and moved (generally to a remote location) where residual moisture is driven off, typically by means of external heat provided within an oven or dryer.

As will be seen hereafter, one feature of the present invention resides in a perlite insulation board which is more economical than the standard board discussed above, from the standpoint of material costs, and yet a board which at least approximately meets the physical characteristics discussed above, actually surpassing some of the physical characteristics of the standard board discussed above. As will also be seen, this is accomplished by replacing much of the perlite and fiber in the board for less expensive gypsum.

Another feature of the present invention resides in an improved method of making perlite insulation board, made possible through the use of gypsum and making possible (1) a substantial cost reduction in the capital equipment required in manufacturing the board and/or (2) making possible an uncomplicated and economical conversion from an existing gypsum board producing facility to a perlite insulation board producing facility. With regard to this latter point, there are many similarities between these two types of facilities, i.e., a gypsum producing facility and a perlite board producing facility, which make it possible to even consider such a conversion. However, there is one specific difference to be discussed below which makes it impossible to readily convert a standard gypsum facility into a standard perlite insulation board facility without particular expensive equipment changes.

A typical method of making gypsum board includes forming a gypsum slurry and depositing this slurry on a moving belt between continuous sheets of gypsum paper, typical cover sheets for gypsum board. After the gypsum slurry is deposited between these sheets, it is formed into the final product. Eventually it is moved to a drying oven, generally at a remote location from where the slurry is formed and dewatered. In moving this "green" board to the oven, spaced rollers are generally provided. These rollers, which are quite expensive, are generally spaced from 6 to 12 inches apart.

It has been found that the 6 to 12 inch distance between rollers, just discussed, is sufficiently close for the green gypsum board to easily span in its movement from one roller to another without the board sagging therebetween. However, perlite board having the standard ingredients discussed above and made by the method generally discussed cannot span rollers 6 inches apart while in a green state, i.e., between the time the perlite board is dewatered and the time it reaches the dryer. Standard perlite board facilities use rollers which are spaced, at most, approximately 4 inches apart. This is the specific difference between a standard gypsum board facility and a standard perlite insulation board facility referred to above. Hence, to convert the gypsum facility to a perlite board facility requires an increased number of rollers so as to get the standard green perlite board from the dewatering section of the forming machine to the dryer, both of which could be used in the conversion.

As will be seen, applicants have substantially minimized, if not eliminated, this expensive drawback by providing a perlite insulation board which, is a green state, can span rollers spaced 6 inches apart but which, at the same time, retains the important physical characteristics necessary to make the board a commercially successful product for its intended use as roof insulation. In this regard, with the present invention in mind, conversion from a gypsum facility to a perlite insulation board producing facility becomes especially economically attractive since generally the gypsum ore is located in the approximate vicinity of the facility. Hence, the gypsum which, as stated, replaces much of the perlite and fiber, is substantially less expensive (without taking into account freight) than either perlite or news (with or without taking into account freight).

BRIEF SUMMARY OF THE INVENTION

One object of the present invention is to provide perlite insulation board which utilizes a substantial amount of gypsum but which retains acceptable physical characteristics for its intended use as a perlite insulation board, particularly a roof insulation board.

Another object of the present invention is to provide a perlite insulation board of the type just mentioned which during its manufacture, in a green state, is sufficiently self-supporting to span rollers or other supports spaced further apart than heretofore standard perlite insulation board in the same state.

A further object of the present invention is to provide a method of making a gypsum-containing perlite insulation board.

As stated previously, a standard perlite insulation board includes expanded perlite, the perlite being the largest single ingredient, by weight, in the board, organic fiber, for example, newsprint, and binder, for example, asphalt and starch. The perlite insulation board of the present invention includes all of these ingredients and also includes gypsum, the gypsum being the second largest single ingredient, by weight, in the board. While, as just stated, the perlite is the main ingredient, there is preferably sufficient gypsum dispersed throughout the board so as to form a gypsum matrix throughout the board. However, the amount of gypsum provided must be such that it does not adversely affect in any appreciable way the typical physical characteristics of a standard perlite insulation board. In other words, the board provided in accordance with the present invention is a perlite insulation board utilizing gypsum not as a filler but rather to obtain various, quite specific, advantages. The board of the present invention is not a gypsum board.

In making the board just described, in accordance with the present invention, an aqueous slurry including expanded perlite, gypsum, organic fiber and binder is formed. With the exception of water, the perlite is the largest single ingredient, by dry weight, in the slurry and the gypsum is the second largest single ingredient. A continuous wet mat is formed from the slurry and drained, i.e., dewatered, and thereafter residual moisture is removed, for example, in an oven or dryer. A specific feature in this method resides in mixing the slurry (before formation of the wet mat) in a way which entraps air bubbles so as to increase the bulk of the slurry, i.e., decrease bulk density, prior to formation of the wet mat and thereby reduce the finished product density of the board. This has been found best achieved by moving the slurry at higher than normal solids (as will be seen) through a mixer in the form of a screw conveyor arrangement. Another specific feature of this method resides in moving the wet mat (after being dewatered) from one location, specifically the dewatering location, to another location, specifically the oven, on a plurality of rollers which are spaced apart a greater distance than heretofore possible, specifically 6 inches to 7 inches, preferably 6 inches, as opposed to the 4 inch spacing typically provided.

In making the present invention, applicants have provided a gypsum-containing perlite insulation board which at least satisfactorily meets those important physical characteristics of standard perlite insulation board discussed previously and, in fact, has been found to surpass some of the standard perlite board physical characteristics. The gypsum is not used as a filler but as a strengthening agent and as a process aid. Gypsum not only reduces the material cost of the board but also allows the board to be made with less initial equipment cost or on gypsum board forming equipment with minimized conversion expenses. Conversion of existing gypsum board producing equipment is especially attractive when this equipment is located in close proximity to the raw gypsum ore, which is generally the case, since gypsum, especially without freight costs, is substantially less expensive than perlite and fiber.

DETAILED DESCRIPTION

Figure 1:
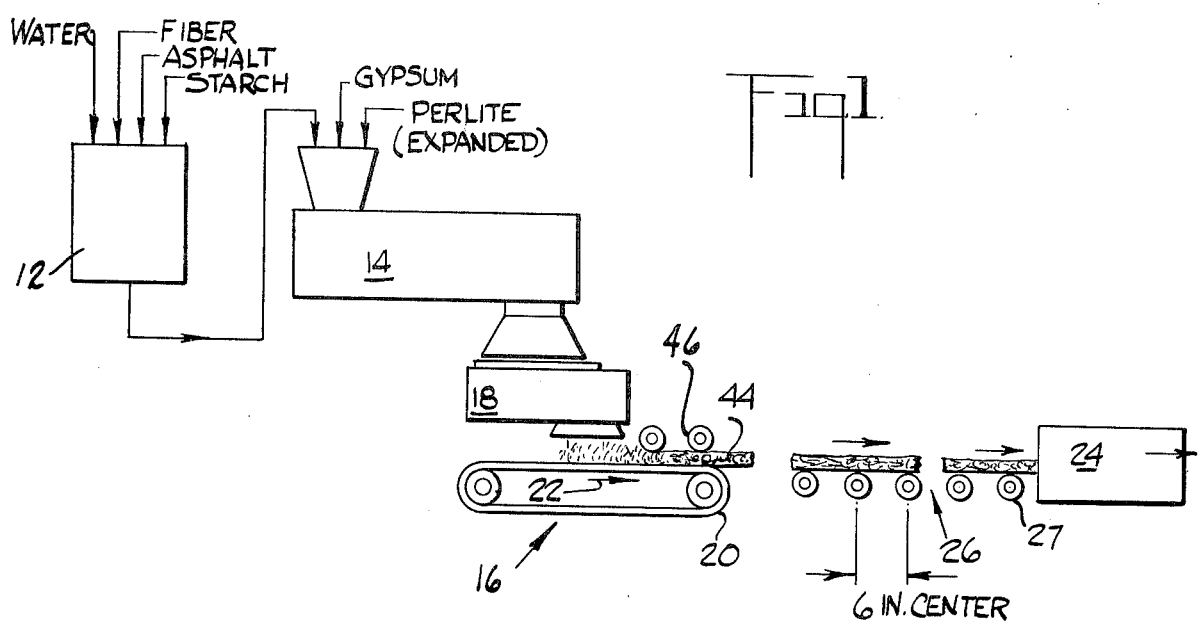
FIG. 1 is a schematic illustration of an overall arrangement for making gypsum-containing perlite insulation board in accordance with the present invention.

As stated previously, perlite insulation boards for use as insulation are well known in the art. A commercially successful and commercially available perlite insulation board is presently being manufactured by Johns-Manville Corporation under the trademark "FESCO". This FESCO board has an approximate density of 10 lbs. per cubic foot and is available in 1 inch and ¾ inch thickness. Several boards can be laminated to provide an individual board of greater thickness. The approximate composition of FESCO board by dry weight percent is as follows:

| | |
|---|---|
| Expanded perlite | 70% |
| Organic Fiber | 23% |
| Asphalt | 5% |
| Starch | 2% |

The main physical characteristics of FESCO board which make the board commercially successful for its intended use are its K Factor (coefficient of thermal conductivity), its MR, its interlaminar strength and its resistance to water absorption. The typical FESCO perlite insulating board made on a Fourdrinier machine having the composition just referred to above, at a thickness of approximately 1 inch and a density of approximately 10 lbs. per cubic foot, has the approximate following values for these physicals:

| | |
|---|---|
| K Value | 0.376 |
| MR | 55 psi |
| Interlaminar Strength | 8 psi |
| Water Absorption (2 Hrs.) | 1.5% (by volume) |
| Water Absorption (3 Weeks) | 22% (by volume) |

The perlite insulation board constructed in accordance with the present invention also includes perlite, organic fiber and a binder, preferably also asphalt and starch. This new board in an actual embodiment is also ¾ inch thick or 1 inch thick and preferably has a density between 10 and 12 lbs. per cubic foot. In an actual embodiment its density is approximately 11 lbs. per cubic foot, i.e., 1 lb. per cubic foot greater than standard FESCO board. In addition, the new board constructed in accordance with the present invention displays values for the physical characteristics referred to above which are approximately equivalent to those of FESCO board and with respect to some of the physicals, the values obtained by the new board surpass those of the standard board, as will be seen hereinafter.

Further, approximately 1,500 sq. feet of the perlite insulation board made in accordance with the present invention were actually installed along with standard FESCO board by experienced roofers on two separate jobs at two different locations. According to the roofers comments, the new board showed superior handleability compared to the standard FESCO board with respect to corner and edge breaking, scuffing, cutting and in-hand feel. The new board also appeared to be harder. Accordingly, from the standpoint of appearance, handleability and physical characteristics, i.e., $k$ value, MR, interlaminar strength and water absorption resistance, the perlite insulation board constructed in accordance with the present invention is capable of competing with commercially successful FESCO perlite insulation board presently being manufactured.

The major difference between the board constructed in accordance with the present invention and standard perlite insulation board, from a composition standpoint, is that the new perlite insulation board includes a substantial amount of gypsum. In fact, while perlite remains the largest single ingredient in the board, the gypsum is the second largest ingredient, by dry weight of the board. In an actual and preferred embodiment, a sufficient amount of gypsum is provided so as to form a gypsum matrix throughout the board. This gypsum, which preferably replaces much of the perlite and organic fiber, specifically newsprint, as opposed to asphalt or starch, is not added merely as a filler replacing more expensive perlite and newsprint but, as will be seen hereinafter, is provided as a strength producing agent and as a processing aid to obtain certain process advantages which are economically significant.

As will be described in more detail below with respect to FIGS. 1, 2 and 3, the new perlite insulation board, like standard perlite insulation board, is preferably made by a wet forming process on a Fourdrinier type machine. In accordance with this process, a dilute aqueous slurry of the ingredients is prepared and deposited on a moving wire so as to form a wet mat. This wet mat is dewatered to a large extent and, while in a green state, transferred, typically on spaced rollers, to a dryer where residual moisture is removed. In standard FESCO board producing facilities, the rollers just referred to are typically spaced apart, at most, approximately four inches. This is critical since standard perlite insulation board in its wet mat state does not have sufficient green strength to span rollers much further than 4 inches apart. In accordance with the present invention, gypsum is utilized to add sufficient green strength to the board so that in its wet mat state it has sufficient green strength to span rollers spaced greater distances than 4 inches. In an actual embodiment, the board constructed in accordance with the present invention in its wet mat state has sufficient green strength to span rollers spaced 6 inches apart, even though in most other respects, the board is similar to standard perlite insulation board.

The process improvement just described is quite significant for two reasons. First, should new Fourdrinier type facilities for making perlite insulation board be desirable, fewer rollers would be required for conveying the board in its wet mat state from the dewatering section of the Fourdrinier to the drier. This capital expenditure savings could be significant. Second, should it be found desirable to convert an existing gypsum board producing facility to a perlite insulation board facility, the rollers used in the latter facility, which are generally spaced further apart than those in a perlite board facility, would not have to be significantly increased in number, if at all. In addition to these process advantages, the fact that, at the present time, gypsum is less expensive than either perlite or newsprint makes the new board attractive from a material cost standpoint. All of these advantages were discussed in more detail above.

Having described applicant's new gypsum-containing perlite insulating board and its advantages in general, attention is now directed to a detailed discussion of the ingredients making up this board. The first ingredient to be discussed is the gypsum. In this regard, the term "gypsum" which technically is $CaSO_4.2H_2O$ (dihydrate) refers to the resultant product of plaster of paris, specifically $CaSO_4.\frac{1}{2}H_2O$ (hemihydrate) combined with water. However, rather than using both of these terms "gypsum" and "plaster of paris", only the term "gypsum" will be used. It will be quite clear to those skilled in the art whether the term "gypsum" refers to dihydrate (gypsum) or hemihydrate (plaster of paris) depending upon the context in which it is used.

The amount of gypsum provided in the gypsum-containing perlite insulation board is preferably between 25% and 40%, by dry weight, of the total board. Above 40%, the gypsum tends to adversely affect the desired physical characteristics of the board and, in any event, makes it extremely difficult to obtain a board within a preferred density range of between approximately 10 and 12 lbs. per cubic foot. Below 25%, it has been found that the gypsum does not reliably attain the process improvement discussed above. The reason for this, it is believed, is that below approximately 25%, the gypsum does not reliably form a gypsum matrix throughout the finished board, which matrix, it is believed, is primarily responsible for the process improvement discussed above. As the amount of gypsum is increased from 25% towards 40% by dry weight of the board, this matrix is more reliably and consistently formed. In an actual embodiment, between approximately 30 and 35% gypsum, by dry weight, of the board, preferably approximately 35%, is utilized. In any event, the gypsum constitutes the second largest single ingredient in the board, the perlite being the largest single ingredient, and is preferably provided in a sufficient amount to form the gypsum matrix just discussed.

As previously stated and just reiterated, the largest single ingredient by dry weight in the perlite insulation board of the present invention is expanded perlite. The perlite is also the largest single ingredient, by volume in the board. A preferred range of expanded perlite by dry weight of the board is between approximately 42% and 57%. With less than approximately 42 % expanded perlite, it is extremely difficult to obtain the low density desired, i.e. between 10 and 12 lbs. per cubic foot, and it is difficult to obtain a K factor value which approximates that of standard perlite insulation board. Providing greater than approximately 57% expanded perlite either reduces the amount of gypsum that can be provided in the board to a level below the preferred range or requires reducing the preferred level of organic fiber, asphalt and/or starch to levels below those which are desired, which desired levels will be discussed below. In an actual embodiment of the present invention, approximately 42% expanded perlite (as compared to 70% in standard FESCO board) is provided along with the 35% gypsum discussed above. At these dry weight percentages the volume ratio of perlite to gypsum is approximately 17:1.

The specific expanded perlite used may be identical to that used in standard perlite insulation board such as previously discussed FESCO board. More specifically, the expanded perlite may have a bulk density of between 3.8 and 4.2 pcf, approximately 4.0 lbs. per cubic foot in the actual embodiment. The size of most of this perlite ranges from minus 325 mesh to plus 24 mesh, preferably not more than 20% being larger than 8 mesh. However, large granule sizes, assuming that there be an adequate range of smaller sizes, are objectionable only to the extent that they may tend to float to the top in an aqueous slurry and thereby segregate. If perlite floatation does not result then larger sizes could be used. Specific grades of expanded perlite which have been found to be satisfactory are those grades designated as PA 1S1, PA 1S4, and PA 1S5 by Johns-Manville Corporation. For a detailed description of the type and size of perlite which may be satisfactory, reference is made to the previously cited Denning Patent.

Having discussed the major ingredients comprising the board of the present invention, i.e., the perlite and gypsum, attention is now directed to the minor ingredients in the board, specifically the fiber and binder. The fiber used is preferably organic fiber and more preferably newsprint fiber which has been quite successfully used in standard perlite insulation board of the type described above. The exact nature of the fiber is well known in the art. In addition, for a detailed description of suitable fiber reference is made to the Denning patent. This fiber, which serves to increase the strength of the finished board, is provided in amounts ranging between approximately 11% and 13%, by dry weight of the board. In the actual embodiment, with expanded perlite at 42% and gypsum at 35%, the board includes approximately 12% newsprint fiber, by dry weight. Note that this is approximately a 50% reduction in newsprint fibers compared to the standard FESCO board described above. This reduction is due to the introduction of the gypsum.

With a reduction in fiber there would be an inherent reduction in the finished product strength of the board. However, the gypsum in the board mitigates this reduction in finished product strength. In addition, to further mitigate this loss in strength, in fact, to bring the strength back to where it should be as compared to the standard perlite insulation board, the binder system of the board is relied upon. More specifically, the binder is preferably increased as compared to standard perlite insulation board. Preferably, both asphalt and starch are utilized in combination. The asphalt, which preferably has a high softening point (210° F) is provided in an emulsion form at an amount between approximately 6 and 8% by dry weight. In the actual embodiment, with 42% expanded perlite, 35% gypsum and 12% news, approximately 7% asphalt, by dry weight, is utilized, approximately 2% more than is used in the standard FESCO board described above. The starch used is preferably tapioca starch (having a low gel point) and is provided in amounts between 3 and 5% by weight. With approximately 7% asphalt in the working embodiment, approximately 4% starch is utilized, this being twice as much as that normally used in the standard FESCO board.

Having described the general and preferred compositions of the gypsum-containing perlite insulation board of the present invention, attention is now directed to its physical properties as compared to standard FESCO perlite insulation board, keeping in mind that one object of the present invention is to attain certain specific physical characteristics which are at least approximately equivalent to that of FESCO board. These specific physical characteristics, as stated previously, are density, K value (coefficient of thermal conductivity), modulus of rupture (MR), interlaminar strength and both short term and long term water absorption resistance. In making this comparison, finished FESCO board and finished gypsum-containing board of the present invention made from actual plant runs on a Fourdrinier machine and on a Fourdrinier pilot plant machine were used. The FESCO board was made in accordance with standard process practices discussed previously and the gypsum-containing boards were made in accordance with the process to be described hereinafter. The general formulation for each board is shown in Table 1. In this regard, the percent value for each ingredient is the approximate average value, by weight, for each ingredient in the various boards compared.

TABLE I

| Standard Formulation | Amount |
|---|---|
| Perlite | 70% |
| Fiber | 23% |
| Asphalt | 5% |
| Starch | 2% |
| Formulation With Gypsum | Amount |
| Perlite | 42% |
| Fiber | 12% |
| Asphalt | 7% |
| Starch | 4% |
| Gypsum | 35% |

Table II lists the specific physical properties referred to above for each of the boards set forth in Table I. The value for each of the physical properties is the average of the values obtained for several tests. These average values do not include values which were way out of line due to obvious errors in making the comparison boards or obvious errors in taking the values. The values were taken by standard procedures known in the art.

TABLE II

| Standard Formulation | Value |
|---|---|
| Density | 10 pcf |
| K Value | .38 |
| MR | 79 psi |
| Interlaminar | 11.5 psi |
| Water Absorption (2 Hrs.) | 0.6% (by volume) |
| Water absorption (3 weeks) | 22% (by volume) |
| Formulation With Gypsum | Value |
| Density | 11 pcf |
| K Value | .36 |
| MR | 58 psi |
| Interlaminar | 16.5 psi |

TABLE II-continued

| | |
|---|---|
| Water Absorption (2 Hrs.) | 0.8% (by volume) |
| Water Absorption (3 weeks) | 23% (by volume) |

From Table II it can be seen that the average density of the gypsum-containing perlite insulation board of the present invention is approximately 1 lb. per cubic foot greater than the density of standard FESCO board. While it would be desirable to have a gypsum-containing board with a 10 lb. per cubic foot density, it has been found to be difficult to bring the density value down to this level, in view of the large amount of gypsum utilized. In fact, it was quite surprising that a value as low as 11 lbs. per cubic foot for the gypsum-containing board could be obtained. However, this relatively low density value is obtained, it is believed, due to the particular method by which the board is made, as will be seen hereinafter. In any event, the gypsum-containing board of the present invention is found to be completely satisfactory from the standpoint of weight. Hence, while the density of the board could be reduced through process and/or formulation modification, it is not believed necessary and/or desirable, especially in view of the other satisfactory physical characteristics obtained at approximately 11 lbs. per cubic ft. density.

As also seen in Table II, the coefficient of thermal conductivity, i.e., the K value of the gypsum-containing board, is approximately the same as that of the standard FESCO board. In fact, some of the figures obtained making up the average K value shown in Table II were lower (better) than that for the standard FESCO board. It is, of course, critical to the board that it have an acceptable K value since one of the primary functions of the board is to act as an insulation in its preferred intended use. It was, in fact, unexpected and surprising that the board containing as much as 35% gypsum, by weight, could achieve such a satisfactory K value. The probable reason for this is the introduction of air pockets throughout the mass of the final product brought about by a mixing technique in making the product, to be discussed below.

Both the modulus of rupture and interlaminar strength of the gypsum-containing board are more than adequate as compared to standard FESCO board. In fact, while the MR of the gypsum-containing board was found to be approximately equal to or slightly lower than that of the standard FESCO board, the interlaminar strength of the board of the present invention was found to exceed that of the FESCO board. Both of these physical characteristics relate to the strength of the board and particularly its handleability and performance in the field. As stated previously, when experienced roofers compared a number of samples of each board from the standpoint of handleability, actually from the standpoint of assembly in the field, their comments generally were that the gypsum-containing board showed superior handleability compared to the standard FESCO board with respect to corner and edge breaking, scuffing, cutting and in-hand feel. The gypsum-containing board, from the standpoint of visual observation and touch were found to be harder.

From the standpoint of water absorption resistance, Table II indicates with respect to short term water absorption resistance, the gypsum-containing board is approximately equivalent to that of the standard FESCO board. With respect to long term water resistance, the gypsum-containing board also approximates that of the standard board.

The specific physical characteristics just discussed, are, of course, not the only physical characteristics of interest but, rather, are the main ones in which the finished product is judged from the standpoint of possible commercial success. Other finished product physicals include, for example, peel resistance, dustiness and so on, which are well known to those skilled in the art. These other finished product physicals have been found to be satisfactory, especially for the boards intended use as roof insulation.

Having described the gypsum-containing board of the present invention in finished product form, attention is now directed to the preferred method by which it is made. In this regard, FIG. 1 illustrates schematically an overall arrangement for making the board, the arrangement being generally indicated by the reference numeral 10. With certain exceptions to be discussed hereinafter, the various equipment making up arrangement 10 is conventional and has been used in making standard perlite insulating board and/or standard gypsum board. As seen in FIG. 1, arrangement 10 includes a holding tank 12, commonly referred to as a machine chest and a slurry mixer 14, commonly referred to as an infuser which, as will be seen hereinafter, is constructed in accordance with a specific process feature of the present invention. Arrangement 10 also includes a Fourdrinier machine 16 having, among other components which are well known, a headbox 18 and what is commonly referred to as a wire 20 which is a moving screen moving in the direction of arrow 22. Fourdrinier 16 is conventional with the possible exception of headbox 18 which, in a preferred embodiment, is constructed in accordance with another feature of the present invention.

Arrangement 10 also includes a conventional drier 24 which is spaced a substantial distance from Fourdrinier 16 and a conveyence arrangement 26 which is provided for conveying the gypsum-containing board made on the Fourdrinier, in the wet mat stage, to drier 24. As shown in FIG. 1, conveyance arrangement 26 includes a plurality of rollers 27 spaced apart from one another to carry the gypsum-containing board to the drier. For those reasons to be discussed hereinafter as well as those reasons discussed previously, the spacing between these rollers are significant to the present invention.

In accordance with the preferred method of making the gypsum-containing board, all of the ingredients making up the board with the exception of the expanded perlite and gypsum are blended in a pulper area hold tank (not shown) and eventually transferred to the machine chest 12. More specifically, the fiber, specifically newsprint, in the desired amount is pulped in a slurry, preferably having a solids consistency of approximately 3%. Proper quantities of asphalt and starch are mixed in the hold tank with the pulped newsprint. This overall mixture is deposited into the machine chest along with white water (dilution water), again in proper amounts. Where it is desirable to use "broke", i.e., finished product material, for example, rejects, the broke is added to the machine chest but preferably should not be added in an amount which exceeds approximately 10% by weight of the total solids in the machine chest.

The slurry in machine chest 12, i.e., the newsprint fiber, asphalt, starch and water, is transferred by suitable means to infuser 14. At the same time, both expanded perlite and gypsum, in proper amounts are also deposited into the infuser by suitable means, for example, screw conveyors (not shown), from respective use bins (not shown). The exact amount of the various solid ingredients, i.e., the expanded perlite, gypsum, fiber, asphalt and starch delivered to the infuser will depend upon the desired formulation of the board. As stated previously, in an actual working embodiment, approximately 42% perlite, 35% gypsum, 12% fiber, 7% asphalt and 4% starch, by weight, are provided in the infuser along with the white water from chest 12. Other known processing aids may also be provided in the slurry.

The amount of white water combined with the various solids making up the overall slurry, or furnish, as it is commonly called, in the infuser is preferably such that the overall furnish has a solid consistency of between approximately 12% and 13%. Note that this is substantially higher than the typical 3% to 8% solids consistency, generally 4 to 5%, in the furnish which makes standard FESCO board. The higher solids consistency is desirable in order to provide the finished product density of approximately 10 to 11 lbs. per cubic foot, as will be seen.

In addition to making it possible to provide the desired finished product density of the board, the higher solids consistency has several process advantages over the lower solids consistencies used in making standard perlite insulation board. First, at approximately 4 to 5% solids consistency (standard perlite insulation board) approximately 2½ times more water is required than is necessary at a 12 to 13% solids content in making the gypsum-containing perlite board. This means that 2½ times more water would have to be handled by arrangement 10 which can be quite expensive from the standpoint of water handling equipment. Second, the wet mat formed on Fourdrinier 16 (as will be discussed below) at this higher solids slurry includes less water to be initially removed than a wet mat made from the lower solids slurry. This means that the dewatering section of the Fourdrinier (to be discussed below) requires less suction equipment in dewatering the wet mat.

At the infuser, the slurry or furnish is mixed to provide a uniform blend of solids. This mixing step has been found to be a key feature in the preferred process for making gypsum-containing board of the present invention. More specifically, in order to decrease the wet bulk density of the furnish, the furnish is mixed in a way which entraps air bubbles uniformly throughout its mass. This decreases the wet bulk density from a value of approximately 60 pcf, the value without entrapped air bubbles, to a value of approximately 50 lbs. per cubic foot. By entrapping these air bubbles and, as a result, reducing the wet bulk density of the furnish to a level of 50 pcf it is possible to obtain the 10 to 12 pcf density of the finished board using approximately a 12 to 13% solids consistency, regardless of the fact that as much as 35% gypsum is in the furnish. As stated, this is believed to be due to the entrapped air bubbles in the final board. In this regard, at 4 to 5% solids, it is difficult, if not impossible, to entrap the air bubbles just described and, hence, it is difficult, if not impossible, to reduce the bulk density of the furnish.

Figure 2:
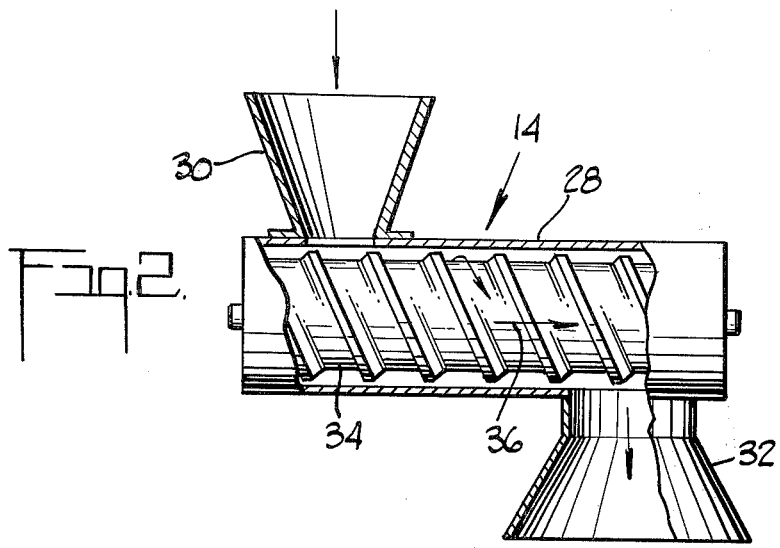
FIG. 2 is a schematic illustration of a preferred slurry mixer comprising part of the overall arrangement illustrated in FIG. 1.
Figure 3:
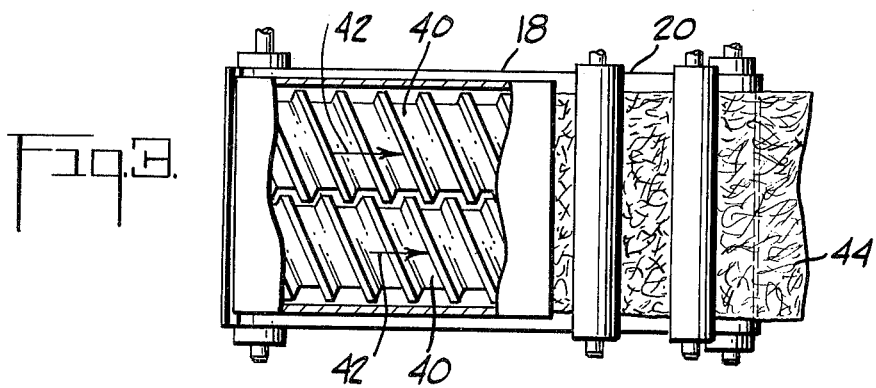
FIG. 3 is a schematic illustration, in plain view, of a preferred headbox assembly comprising part of the overall arrangement illustrated in FIG. 1.

The preferred infuser to perform the mixing operation just described is illustrated in FIG. 2. This infuser includes a longitudinally extending housing 28 having an inlet 30 through which the furnish passes in gaining entrance into the housing and an outlet 32 through which the furnish passes after having been mixed. Located within housing 28 is a longitudinally extending screw 34 which is rotatably supported by suitable means (not shown) and powered by suitable means (also not shown) so as to rotate about its axis. The screw rotates in a way which moves the furnish within housing 28 in the direction of arrow 36 between the screw and inner wall of the housing. As the furnish moves in the direction of arrow 36 between the screw and inner wall of the housing. As the furnish moves in the direction of arrow 36 between the screw and housing the furnish is suitably mixed in the manner described above so as to (1) uniformly disperse the solids in the furnish and (2) so as to reduce the bulk density of the furnish by entrapping air bubbles therein. In an actual working embodiment of infuser 14, screw 34 is approximately 12 feet long and has a diameter (from blade tip to blade tip) of approximately 9 inches. The distance between adjacent blade tips is approximately 8½ inches and the distance from the blade tip to the inner side walls of housing 28 is approximately ½ – ¾ inches.

It is of course to be understood that the actual embodiment of infuser 14 described above has been provided for exemplary purposes only. The size of housing 28 and screw 34 and the speed at which the screw moves the furnish through the housing will depend on the furnish composition, its solids consistency, its initial wet bulk density and the reduction in bulk density desired and the process speed. In fact, other types of mixers which reduce the bulk density to the desired levels would, of course, be sufficient.

From infuser 14, the mixed furnish is deposited onto the moving wire 20, either directly (not shown) or via headbox 18. If moved directly to the wire (omitting the headbox), the furnish is so moved by means of a chute (not shown) which is either stationary or which traverses the wire. A vibrator (not shown) preferably an angled vibrator, is then used to vibrate the wire to uniformly distribute the furnish across the wire. If the slurry is moved through the headbox at the high solids furnish, it may be desirable and, possibly necessary, to provide specific means for moving the slurry from the headbox onto the wire. One way in which this is accomplished is by utilizing a pair of intermeshing screws 40 illustrated in FIG. 3. These intermeshing twin screws are supported by suitable means (not shown) in headbox 18 and extend the length of headbox 18 in a direction parallel to wire 20. The twin screws are powered by suitable means (not shown) so to rotate in a wa$_y$ which moves the furnish through the headbox in the direction of arrows 42 and onto moving screen 20. A suitable vibrator (not shown) may be provided after the headbox 18 to aid in uniformly distributing the slurry across the width of the Fourdrinier. In this regard, it is to be understood that the present process is not limited to the utilization of twin screws 40 to move the furnish across the headbox. Any suitable means which accomplishes this end would suffice.

From the headbox, the furnish is deposited onto screen 20 which, as stated previously, moves in the direction of arrow 22. As the furnish is so deposited, it forms a wet mat on the screen, the wet mat being generally indicated by reference numeral 44 in FIG. 1. This wet mat moves in a conventional way on the wire in a direction away from headbox 18 and, as it so moves, it is dewatered by conventional suction means (not shown) and press rollers generally indicated at 46. The water so removed is transferred by suitable means to, for example, a recycle tank. At this point, in the actual working embodiment of the present invention, the amount of water drained from the mat is such that the mat's solids content is approximately at 25%, as compared to its initial 13% solids content. It is interesting to note that this 25% value is approximately the same as that of standard FESCO perlite insulation board at the same stage in its process even though the initial solids content of the standard slurry is much lower than 13%.

After having dewatered the wet mat to the level just described or to whatever other level is desired, and/or deemed necessary, it is conveyed in this green state to dryer 24 where any residual moisture in the wet mat is removed so as to form the finished product. To accomplish this conveyance, arrangement 26 includes conventional conveyance means including previously mentioned spaced rollers 27. These rollers which generally provide the sole support for the wet mat as it moves across arrangement 26 from the Fourdrinier machine to the dryer must be spaced sufficiently close together so as to allow the wet mat to span the rollers without sagging therebetween. Stated in the converse way, the wet mat must have sufficient green strength to span adjacent rollers at whatever distance the rollers are spaced apart without sagging therebetween. As stated previously, standard gypsum board made in the way described above can readily span rollers spaced on 6 – 12 inch centers. On the other hand, standard FESCO board made in accordance with the process described above cannot span rollers spaced on 6 inch centers but rather requires a 4 inch on-center spacing. This, of course, means that for conveying FESCO perlite insulation board the same distance from the Fourdrinier to the dryer as gypsum board requires substantially more rollers. These rollers, as also stated previously, can be quite expensive.

In accordance with another feature of the present invention, wet mat 44 is, capable of spanning rollers spaced on 6 inch centers even though the mat is a perlite insulation product and not a gypsum product. However, it is the gypsum which makes this possible. More specifically, a sufficient amount of gypsum is provided in the furnish and dispersed throughout the furnish so as to form a partially cured gypsum matrix throughout the mat when the mat reaches conveyance arrangement 26. This matrix provides sufficient wet strength to the mat so as to allow the latter to span rollers spaced on 6 inch centers. This capability is particularly significant in view of the fact that the overall finished product can satisfactorily compete with standard FESCO board and, for that matter, any other commercially available perlite insulation board from the standpoint of physical characteristics and from the standpoint of cost. In fact, with regard to this latter point, the gypsum containing board of the present invention has several advantages over standard FESCO board, as discussed previously.

At some point between the time wet mat 44 is formed and the time it reaches the dryer, the gypsum in the mat must begin to set up. To accomplish this a suitable retarding agent or accelerating agent may be required. Whether a retarding agent or accelerating agent or either is required will depend on the type of gypsum used and the overall process details, for example, the distance between the Fourdrinier and dryer. In any event one with skill in the art can readily determine which agent to us (if any) and how much should be used.

We claim:
1. An insulation board, comprising:
   a. expanded perlite, said perlite being the largest single ingredient, by dry weight, in the board;
   b. gypsum, said gypsum being the second largest single ingredient, by dry weight, in the board;
   c. organic fiber as a minor ingredient, by dry weight, in the board; and
   d. binder as a second minor ingredient, by dry weight, in the board.
2. An insulation board according to claim 1 wherein said gypsum is dispersed throughout the board and forms a gypsum matrix throughout the board.
3. An insulation board according to claim 2 wherein said binder includes asphalt and starch.
4. An insulation board according to claim 3, said board consisting essentially of said expanded perlite, gypsum, organic fibers, asphalt and starch.
5. An insulation board according to claim 4 wherein said gypsum comprises between approximately 30% and 35%, by dry weight, of the board.
6. An insulation board according to claim 1 wherein said binder includes asphalt and starch, said board having the following approximate formulation by percent dry weight:

| | |
|---|---|
| expanded perlite | 42% to 57% |
| gypsum | 25% to 40% |
| organic fiber | 11% to 13% |
| asphalt | 6% to 8% |
| starch | 3% to 5%. |

7. An insulation board according to claim 6, said board having the following approximate formulation by percent dry weight:

| | |
|---|---|
| expanded perlite | 42% |
| gypsum | 35% |
| organic fiber | 12% |
| asphalt | 7% |
| starch | 4%. |

8. An insulation board according to claim 7 wherein said fiber is newsprint.
9. An insulation board according to claim 8 wherein said starch is tapioca starch.
10. An insulation board according to claim 9, said board having a dry weight density of between approximately 10 and 12 lbs./ft$^3$.
11. An insulation board according to claim 10, said board being approximately 1 inch thick and having a coefficient of thermal conductivity of approximately 0.36.
12. In a perlite insulation board including expanded perlite as the largest single ingredient, by dry weight, in the board, organic fiber and binder, said board having a dry weight density of between approximately 10 lbs/ft$^3$ and 12 lbs/ft$^3$ and a coefficient of thermal conductivity of approximately 0.36, the improvement comprising:

gypsum dispersed throughout said board, said gypsum being the second largest single ingredient, by dry weight, in the board and forming a gypsum matrix throughout the board.

13. The improvement according to claim 1 wherein said gypsum comprises between approximately 30% and 35%, by dry weight, of the board.

14. The improvement according to claim 13 wherein said binder includes asphalt and starch, said board consisting essentially of the following ingredients by approximate dry weight percent:

| expanded perlite | 42% |
| --- | --- |
| gypsum | 35% |
| organic fiber | 12% |
| asphalt | 7% |
| starch | 4%. |

15. A method of making an insulation board, comprising:
   a. forming an aqueous slurry including expanded perlite, gypsum, organic fiber and binder, with the exception of water the perlite being the largest single ingredient, by dry weight, in said slurry and said gypsum being the second largest single ingredient, by dry weight, in said slurry;
   b. forming a continuous wet mat from said slurry;
   c. draining the water from said wet mat and;
   d. removing residual moisture from said drained mat.

16. A method according to claim 15 wherein said slurry includes between approximately 10% and 13% solids by dry weight, said method including:
   mixing said slurry to entrap air bubbles so as to decrease the bulk density of the slurry prior to formation of said wet mat.

17. A method according to claim 16 wherein said mixing step includes:
   moving said slurry through a screw conveyor to entrap said air bubbles.

18. A method according to claim 16 wherein said slurry is mixed to a degree which provides said slurry with a bulk density of at most approximately 50 lbs./ft$^3$.

19. A method according to claim 15 wherein said slurry includes between approximately 10% and 13% solids by dry weight and wherein as a result of said draining step said mat includes between approximately 25% and 28% solids by dry weight said method including:
   moving said drained wet mat from one location to another on a plurality of rollers which are spaced apart approximately 6 inches, said drained wet mat being unsupported between said rollers.

20. A method of making an insulation board having a dry weight density of between approximately 10 lbs/ft$^3$ and 12 lbs/ft$^3$ and a coefficient of thermal conductivity of approximately between 0.36, said method comprising:
   a. preparing an aqueous slurry having between approximately 10% and 13% solids by dry weight and a bulk density of approximately 50 pcf and said slurry including the following ingredients by approximate dry weight percent:
      (i) 42% to 57% expanded perlite,
      (ii) 25% to 40% gypsum,
      (iii) 11% to 13% organic fiber,
      (iv) 6% to 8% asphalt, and
      (v) 3% to 5% starch;
   b. mixing said slurry to reduce its bulk density to at most 50 lbs/ft$^3$;
   c. forming a continuous wet mat from said mixed slurry;
   d. draining the water from said wet mat; and
   e. removing the residual moisture from said drained mat.

21. A method according to claim 20 wherein said slurry includes the following ingredients by approximate dry weight percent:
   42% expanded perlite
   35% gypsum
   12% organic fiber
   7% asphalt
   4% starch.

22. A method according to claim 21 wherein said aqueous slurry consists essentially of water and said ingredients.

23. A method according to claim 20 wherein said mixing step includes moving said slurry through a screw conveyor so as to entrap air bubbles in said slurry.

24. A method according to claim 20 including:
   moving said drained wet mat from one location to another on a plurality of rollers which are spaced apart approximately 6 inches, said drained wet mat being unsupported between said rollers.

25. In a method of making a perlite insulation board, which method includes forming an aqueous slurry of expanded perlite, organic fiber and binder, forming a continuous wet mat from said slurry, draining the water from said wet mat and removing residual moisture therefrom, the improvement comprising:
   adding gypsum to said slurry in an amount, by dry weight, less than said perlite but sufficient to form a gypsum matrix throughout said mat, said perlite being the largest single ingredient by dry weight in said board.

* * * * *